US008561198B2

(12) United States Patent  
Singh et al.

(10) Patent No.: US 8,561,198 B2  
(45) Date of Patent: Oct. 15, 2013

(54) DETECTION OF MALICIOUS SYSTEM CALLS

(75) Inventors: Baibhav Singh, Bangalore (IN); Rahul Kashyap, Foster City, CA (US)

(73) Assignee: McAfee, Inc., Santa Clara, CA (US)

( * ) Notice: Subject to any disclaimer, the term of this patent is extended or adjusted under 35 U.S.C. 154(b) by 412 days.

(21) Appl. No.: 12/775,773

(22) Filed: May 7, 2010

(65) Prior Publication Data

US 2011/0277035 A1  Nov. 10, 2011

(51) Int. Cl.
*G06F 21/00* (2013.01)

(52) U.S. Cl.
USPC ........................................................... 726/25

(58) Field of Classification Search
None
See application file for complete search history.

(56) References Cited

U.S. PATENT DOCUMENTS

| | | |
|---|---|---|
| 5,987,610 A | 11/1999 | Franczek et al. |
| 6,073,142 A | 6/2000 | Geiger et al. |
| 6,301,699 B1 | 10/2001 | Hollander et al. |
| 6,460,050 B1 | 10/2002 | Pace et al. |
| 6,578,094 B1 * | 6/2003 | Moudgill ........................ 710/57 |
| 6,981,155 B1 | 12/2005 | Lyle et al. |
| 7,506,155 B1 | 3/2009 | Stewart et al. |
| 7,945,953 B1 * | 5/2011 | Salinas et al. .................. 726/22 |
| 2003/0172293 A1 | 9/2003 | Chow et al. |
| 2003/0182572 A1 * | 9/2003 | Cowan et al. ................. 713/200 |
| 2006/0225134 A1 | 10/2006 | Conti |
| 2007/0180524 A1 | 8/2007 | Choi et al. |

* cited by examiner

*Primary Examiner* — David Pearson
(74) *Attorney, Agent, or Firm* — Patent Capital Group

(57) ABSTRACT

Methods, systems, and apparatus, including computer programs encoded on a computer storage medium, for detecting malicious system calls. In one aspect, a method includes monitoring a function vulnerable to a buffer overflow attack; receiving a call to the function, the call associated with a call stack, the call stack including one or more base pointers, and a destination buffer associated with the function; identifying a first critical memory address vulnerable to the buffer overflow attack comprising: determining the first critical memory address based on a base pointer of the one or more base pointers, wherein the base pointer address is greater than an address of the destination buffer; identifying a first address based on the base pointer of the one or more base pointers; and determining that the first address is a critical memory address in response to the first memory address is greater than the address of the destination buffer.

13 Claims, 14 Drawing Sheets

DETECTION OF MALICIOUS SYSTEM CALLS

BACKGROUND

This specification relates to malware protection software.

Malware is any kind of malicious software such as, for example, a computer virus, spyware, and malicious active content. Malware can spread via infected email attachments, shared files, or malicious websites. Malware can also spread inconspicuously via link files that cause malicious activities to be performed, such as downloading malware.

Malware propagates through a variety of different means, including exploiting known vulnerabilities existing in running programs. Some of these exploits include buffer overflow attacks, which allow an attacker to overwrite a portion of memory by writing more information to a buffer than the program is programmed to handle.

While buffer overflow attacks may be used to execute any code the attacker adds into the buffer, historically, buffer overflow attacks have been used to propagate self-replicating malware. For example the Code Red worm, which defaced Internet Web pages, and the SQL slammer, which launched a denial of service attack, used a buffer overflow to infect web servers.

SUMMARY

This specification describes technologies relating to the detection of potentially malicious system calls.

In general, one innovative aspect of the subject matter described in this specification can be embodied in methods that include the actions of monitoring a function vulnerable to a buffer overflow attack; receiving a call to the function, the call associated with a call stack, the call stack including one or more base pointers, and a destination buffer associated with the function; identifying a first critical memory address vulnerable to the buffer overflow attack comprising: determining the first critical memory address based on a base pointer of the one or more base pointers, wherein the base pointer address is greater than an address of the destination buffer. identifying a first address based on the base pointer of the one or more base pointers; and determining that the first address is a critical memory address in response to the first memory address is greater than the address of the destination buffer.

These and other embodiments may optionally include one or more of the following features. Identifying a critical memory address vulnerable to the buffer overflow attack further may include in response to determining the base pointer identifies the memory address greater that the memory address of the destination buffer, identifying the critical memory address based on the base pointer. Copying a first value stored in a critical memory location identified by the critical memory address. Generating a random number, the random number being the same size as the critical memory location. Determining a second value based on the random number and the value. Storing the second value at the critical memory location. Executing the function. Determining a third value based on the second value and the random number. Determining the critical memory location is affected by a buffer overflow in response to determining that the third value and the first value do not match. Determining a second value may include performing an exclusive or operation on the first value and the random number. Determining the third value may include performing an exclusive or operation on the second value and the random number. Identifying a critical memory address vulnerable to the buffer overflow attack may include navigating a structured exception handler chain associated with the thread, the structured exception handler chain including at least one of exception handler node; identifying a second memory address of a structure exception handler node of the at least one exception handler node where the memory address of the structured exception handler node is greater than the memory address of the destination buffer; and determining the critical memory address is the smaller of the first memory address and the second memory address. Identifying a source buffer associated with the call, the source buffer storing a source value. Determining a memory size, the memory size equal to an amount of memory between the memory address of the destination buffer and the critical memory address; determining a second memory size, the second memory size measuring a size of the source value; determining a critical memory location identified by the critical memory address will be affected by a buffer overflow in response to determining the size of the source value exceeds the size of the memory. Other embodiments of this aspect include corresponding systems, apparatus, and computer programs, configured to perform the actions of the methods, encoded on computer storage devices.

Particular embodiments of the subject matter described in this specification can be implemented so as to realize one or more of the following advantages. Potentially malicious system calls may be identified and blocked. The integrity of memory locations in the call stack may be ensured. Malicious code execution may be blocked.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

§1.0 Example Call Stack

Figure 1A:
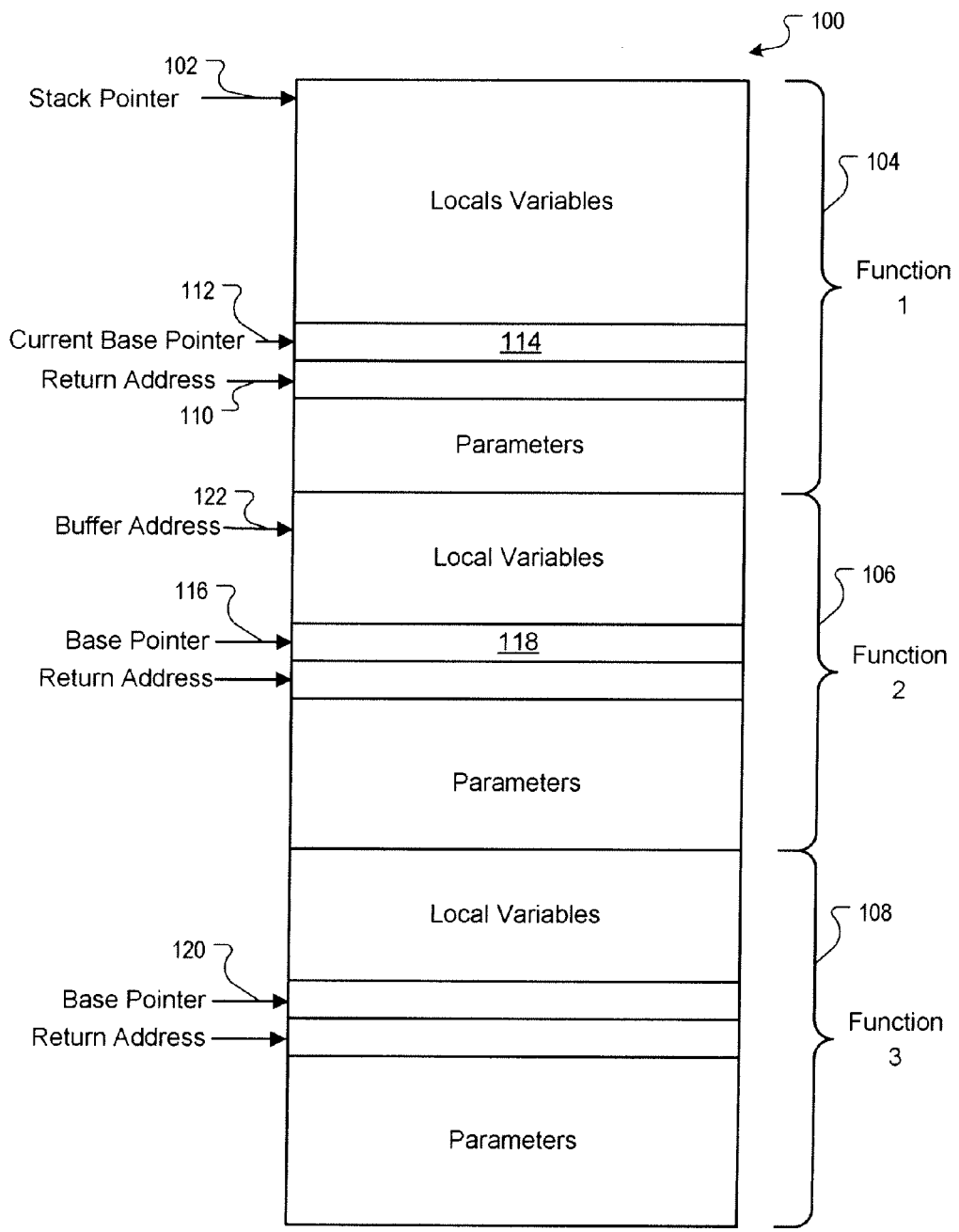
FIG. 1A is a diagram showing an exemplary implementation of a call stack.

FIG. 1A is a diagram showing an exemplary implementation of a call stack. A call stack 100 is a data structure that stores information about executing subroutines of a computer program. As used herein an executing subroutine is a subroutine that has not been terminated and for which a return statement has not been executed.

A stack is a first in, last out data structure, which means that the last item "pushed" onto the stack, is the first item "popped" off the stack. A stack pointer 102 points to the current top of the stack, i.e., points to a memory address identifying a memory location in the stack.

The structure of stack frames vary from based on the hardware of the computer. In general, information about each executing subroutine is stored in a separate stack frame 104, 106, 108 in the call stack 100. For example, referring to FIG. 1, the subroutine "Function 3" is the furthest down the stack (stack frame 108), and was therefore called first. "Function 2" is the next on the stack (stack frame 106) and was therefore called second. "Function 1" is at the top of the stack (stack frame 104) and was called last. In a computer program with a single thread of execution, this indicates that "Function 3" called "Function 2", which called "Function 1".

Each stack frame contains information about the subroutine. For example, each stack frame contains a return address and a base pointer. The return address is the location to which the subroutine should return control when the subroutine terminates. The base pointer identifies the location of the return address. The base pointer of the currently active subroutine is referred to as the current base pointer. In some implementations of the call stack, the memory location identified by a base pointer identifies the base pointer of the calling subroutine and the return pointer is the following entry in the call stack. For example, the current base pointer 112 points to a memory location 114 which contains the address of the base pointer 116. In turn, the base pointer 116, identifies a memory location 118 which in turn contains the address of the next base pointer 120. In many embodiments, the return address is in the memory location immediately following the location identified by the base pointer.

The stack frame may also store parameters associated with the subroutine as well as local variables. For example, the call stack may include memory associated with a buffer 122.

Figure 1B:
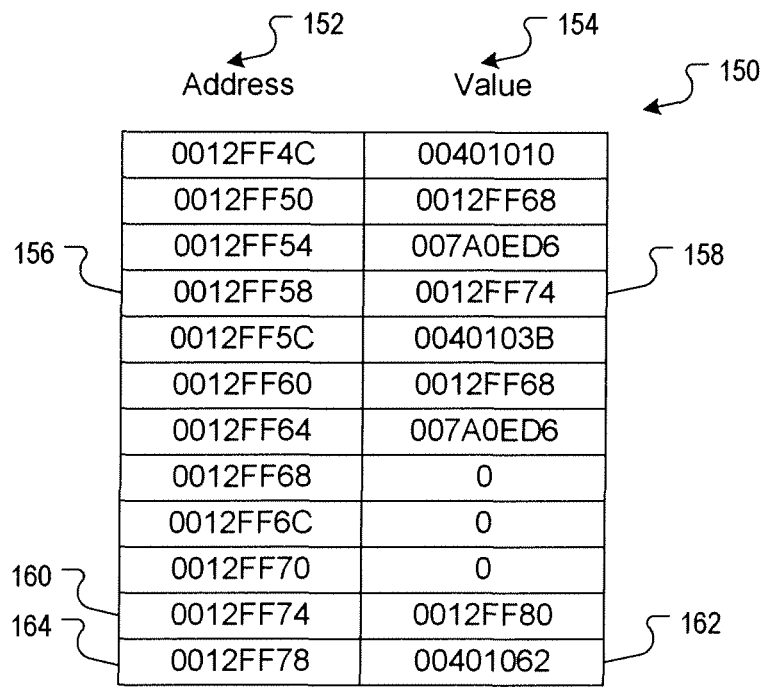
FIG. 1B is diagram showing a table representing an example of memory addresses and values associated with a call stack.

FIG. 1B is diagram showing a table representing an example of memory addresses and values associated with a call stack. The table 150 includes a memory address column 152 and a value column 154. The memory address column identifies the memory address of the memory location in which the value is stored. In this example, a base pointer 156 located at memory address 0012FF58 has a value 158 that identifies the memory address of the next base pointer 160, in this case the value '0012FF74". The return address 162 for the next base pointer 160 is stored in the next available memory location 164. In this example, each memory location is four bytes long and therefore the return address is located at memory location "0012FF74"+4 or at memory address "0012FF78".

§2.0 Example Buffer Overflow Attack

Figure 2:
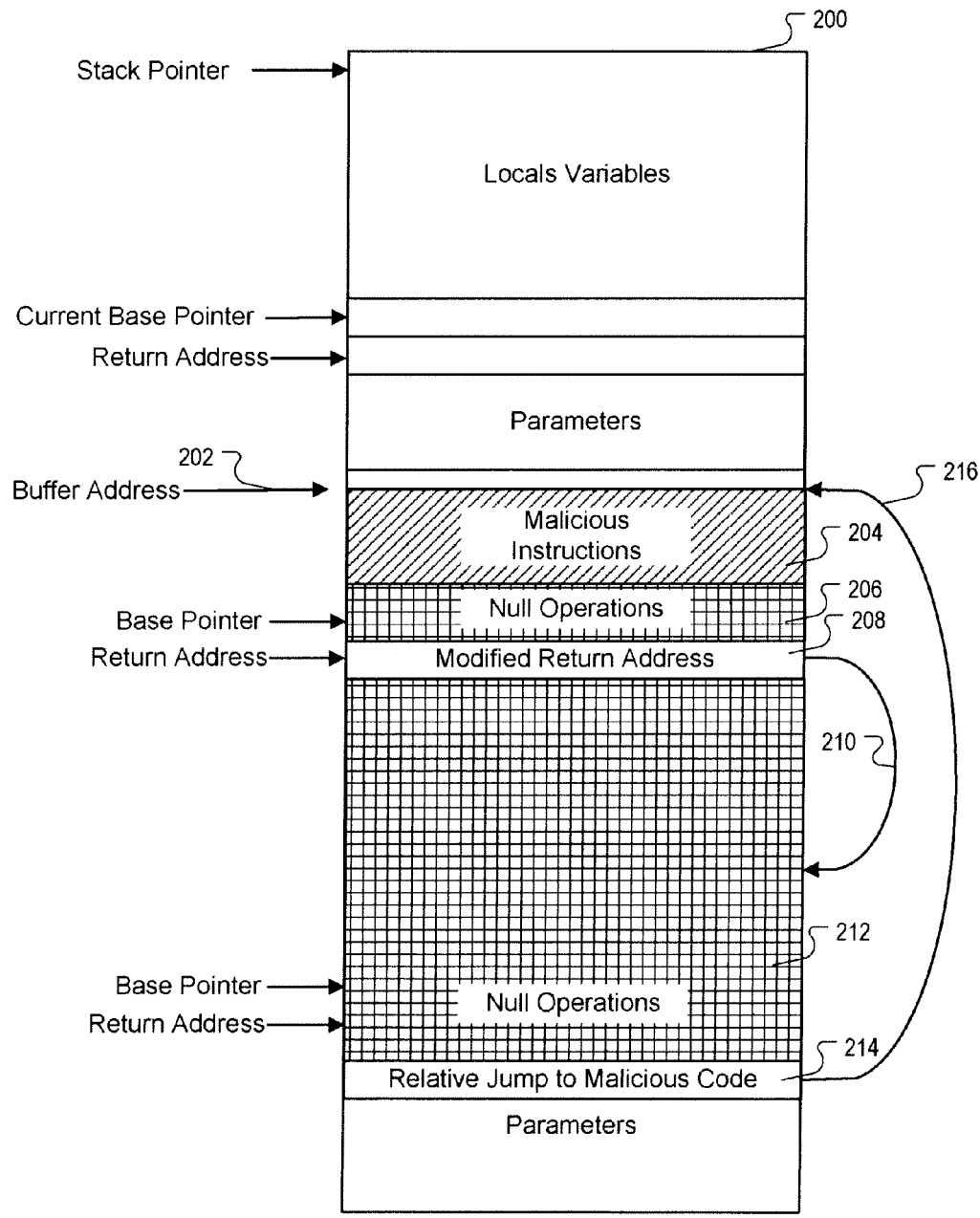
FIG. 2 is a diagram showing an exemplary buffer overflow attack.

FIG. 2 is a diagram showing an exemplary buffer overflow attack. A buffer overflow occurs when a computer program stores data in a buffer which exceeds the size of the memory that the programmer has allocated for it, for example, storing a 6 byte value in a 4 byte memory location. In cases where the programming does not protect against this eventuality, the remaining 2 bytes will overwrite the next memory location. This may cause erratic behavior, crashing, or execution of an instruction(s) that is written by use of the overflow attack and which results in malicious behavior. For example, a buffer overflow may overwrite critical memory locations such as a return address. In this example, when the subroutine terminates and returns control to the calling program, the program will execute whatever is located in the memory identified by overwritten value.

The result makes the computer program vulnerable to exploitation by a buffer overflow attack. For example, referring to FIG. 2, a call stack 200 includes a buffer 202. An attacker adds data to the buffer which causes a buffer overflow. In this example, the buffer includes a set of malicious instruction 204, followed by a series of null operations 206 followed by an instruction to return control to the buffer memory location 208. The value of the return address is modified to point to a location within the null operations. As shown by arrow 210, when the function returns control, it will pass control to instructions within the null operations area 212. The program will then sequentially process null operations until it reaches the jump statement 214 at the end of the null operations. Represented by arrow 216, the jump statement causes the program to execute the instructions within the malicious instructions block 204.

Other buffer overflow attacks are possible. For example, the return address may be overwritten with instructions which cause the program to jump to a pointer stored in a register which refers to a location in the buffer, and thereby execute the malicious code.

§3.0 Detection Buffer Overflow Attacks

Figure 3:
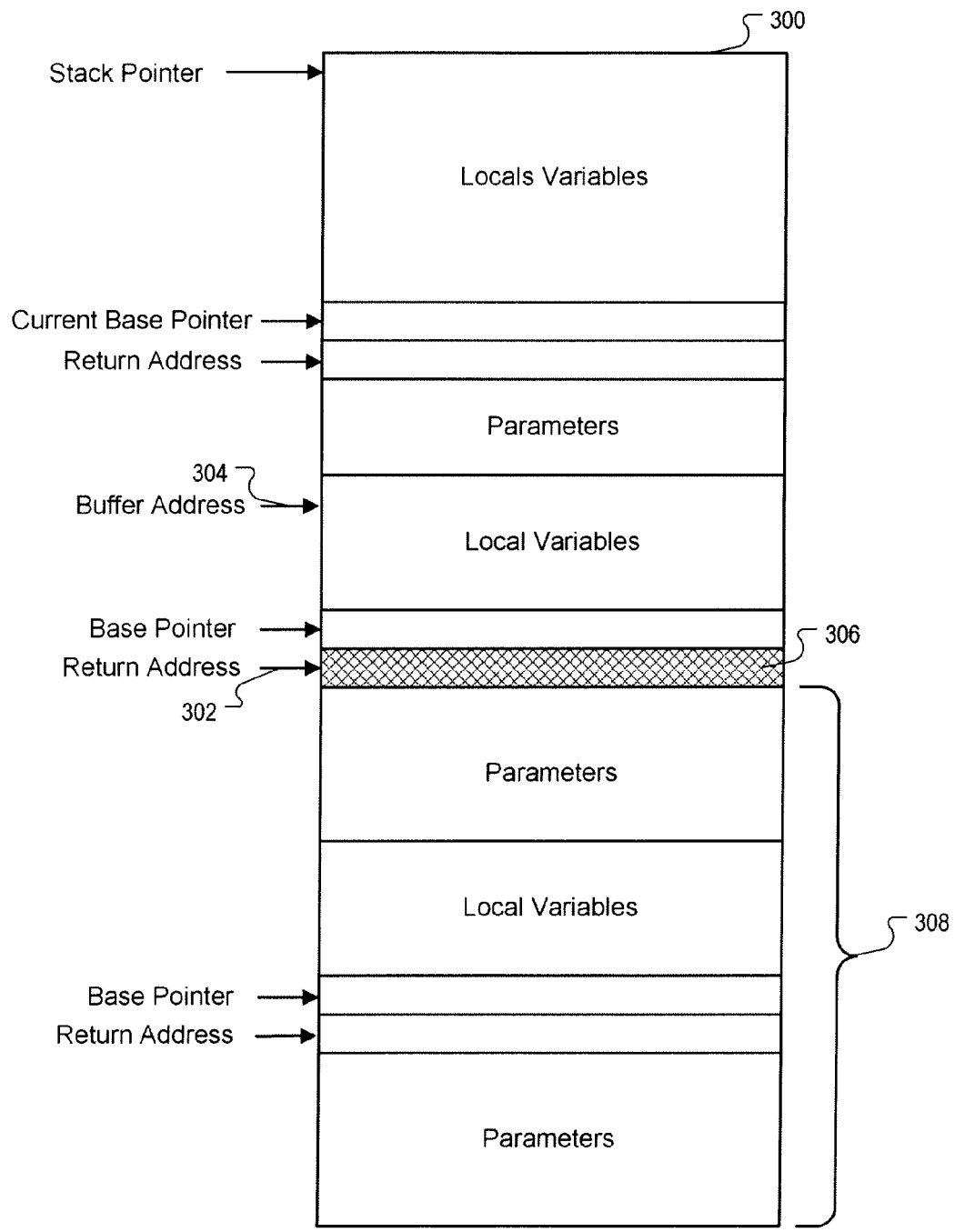
FIG. 3 is a diagram showing an exemplary call stack.

FIG. 3 is a diagram show an exemplary call stack. The call stack 300 includes a first return address located after the buffer which may be identified as a critical memory location. As shown by the shaded memory location 306, the first return address 302 after the buffer address 304 is overwritten to successfully execute a buffer overflow attack based on return addresses. Therefore, potential buffer overflow attacks may be detected by monitoring the return address memory location 306

The memory location 306 may be protected by copying the value of the memory location 306 to another part of memory and, after the potential attack, comparing the values to ensure that the memory location has not changed. However, this approach only ensures that the exact memory location 306 has not been modified. Many buffer overflow attacks are based on known exploits, where an attacker is aware of the structure of the program. A hacker can reasonably guess a correct value for the critical memory location and could incorporate that value into the attack.

To prevent this attack, the critical memory location 306 may be masked with a random number. Because random numbers are by their nature unpredictable, generating a random number and using it to mask the value of the critical memory location makes it unlikely that an attacker could craft a malicious input to bypass the check. Because buffers are written to sequentially, ensuring that the critical memory location 306 has not been subjected to an attack ensures that none of the memory locations after the critical memory location (308) has been subjected to an attack.

Figure 4:
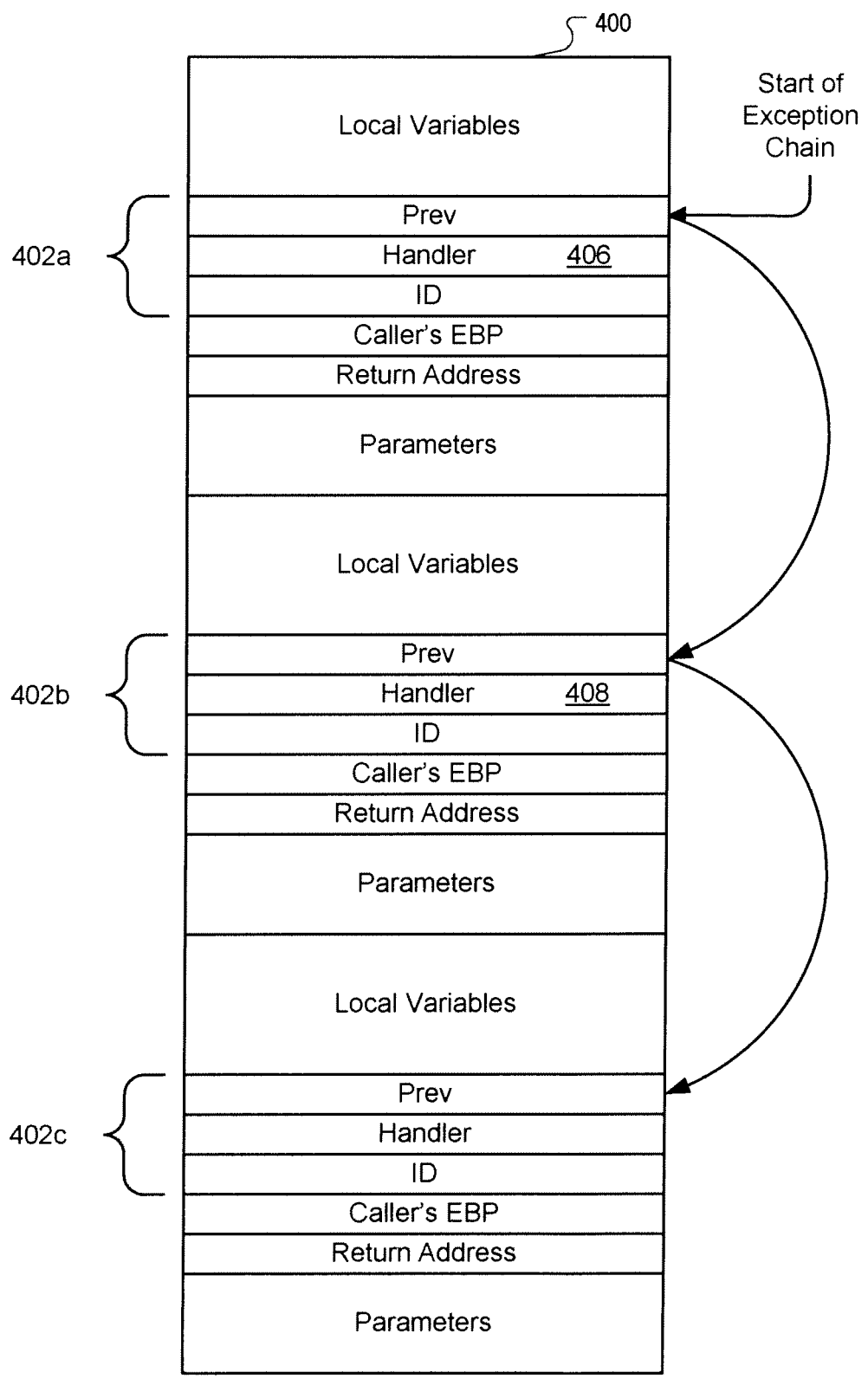
FIG. 4 is a diagram showing a call stack integrated with structured exception handling.

FIG. 4 is a diagram showing a call stack integrated with structured exception handling. Generally, a computer program will execute code stored in an exception handler in response to out of the ordinary occurrences. For example, exception handling processes both hardware and software failures.

In some embodiments, exception handling may be integrated into the call stack 400. For example, in structured exception handing each stack frame includes and exception handling block 402*a-c* including a pointer to an exception handler and a pointer to the exception handling block of the calling function. When an exception occurs, the computer program addresses the handler identified by the handler address 406 in the call stack 400. If the instructions referenced by the handler 406 do not process the exception, then the handler 408 of the calling subroutine is called.

Figure 5:
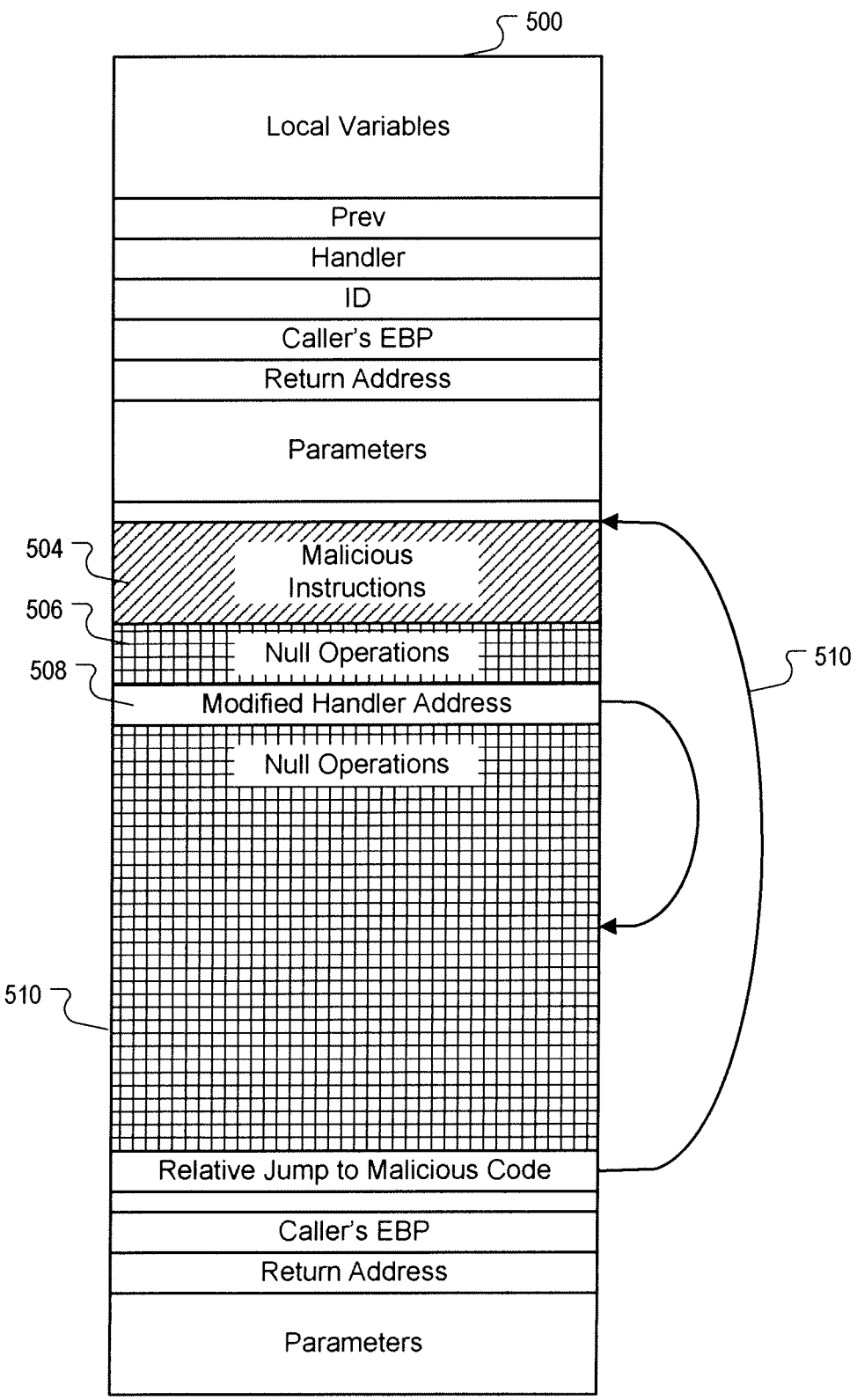
FIG. 5 is a diagram showing an exemplary buffer overflow attack on a call stack utilizing structured exception handling.

FIG. 5 is a diagram showing an exemplary buffer overflow attack on a call stack utilizing structured exception handling. The overflow attack is conducted in a manner that is similar to the manner described with respect to FIG. 2 and the return address. A buffer overflow attack may be accomplished, among other methods, by rewriting the contents of the handler memory location and triggering an exception. For example, the buffer could be overflowed with malicious instructions 504 and a series of null operations 506, 510. The handler address 508 may be modified to point to memory locations overwritten with null operations 510. Represented by arrow 510, the null operations may terminate with a relative jump command passing control to the malicious instructions.

Figure 6:
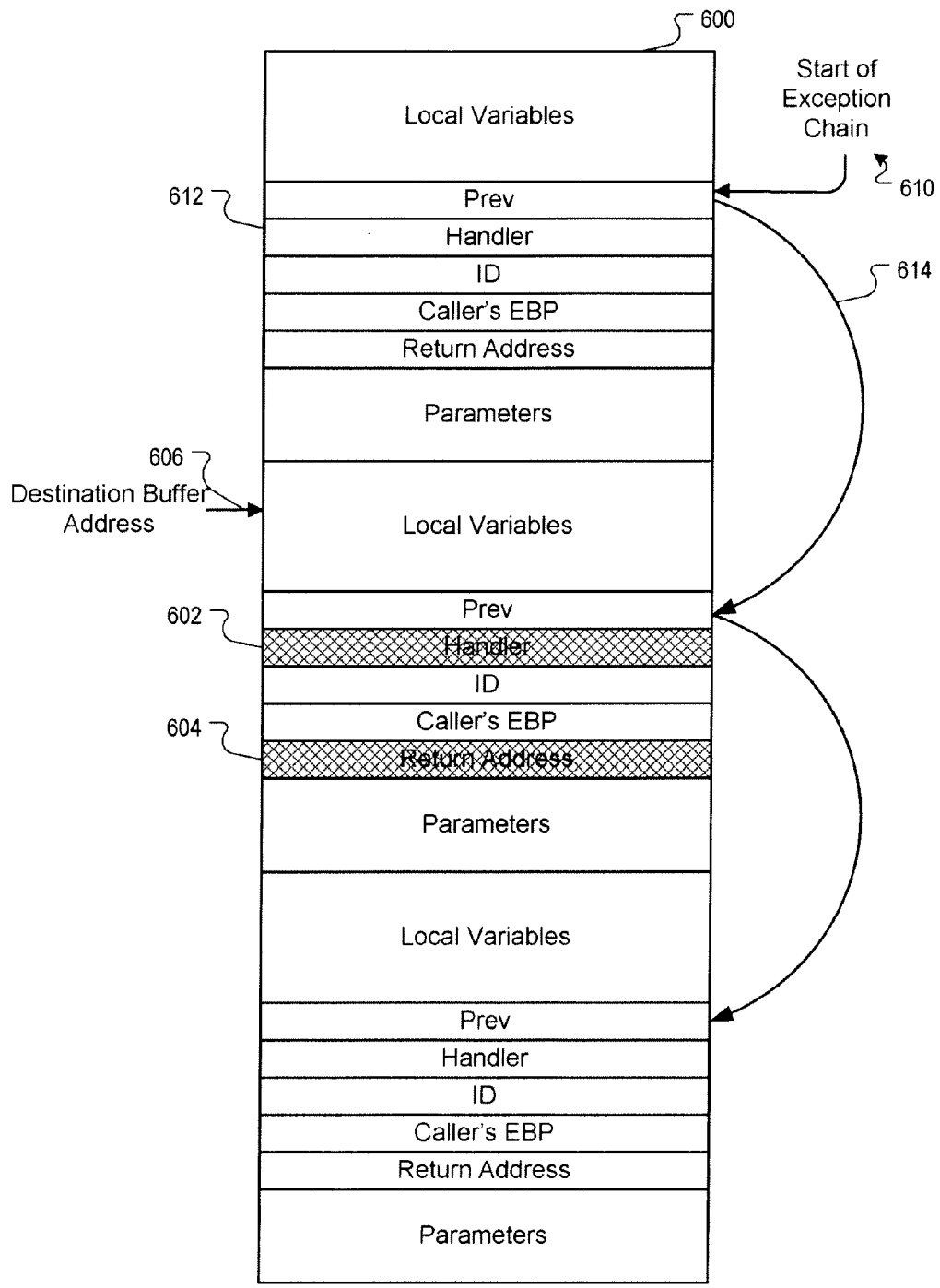
FIG. 6 is a diagram showing an exemplary call stack utilizing structured exception handling.

FIG. 6 is a diagram showing an exemplary call stack utilizing structured exception handling. For computer processes utilizing exception handling in a call stack 600, multiple critical memory locations may be identified (602, 604). The one critical memory location is the first exception handler 602 after the buffer address 606. Another critical memory location is the first return address 604 after the buffer address 604. Because buffer overflow attacks targeting any critical memory location will have to overwrite the first critical memory location to occur after the buffer address, buffer overflow attacks may be detected by monitoring this critical memory location. In this example, the critical memory location is for the exception handler 602.

§4.0 Buffer Overflow Detection Processes

Figure 7A:
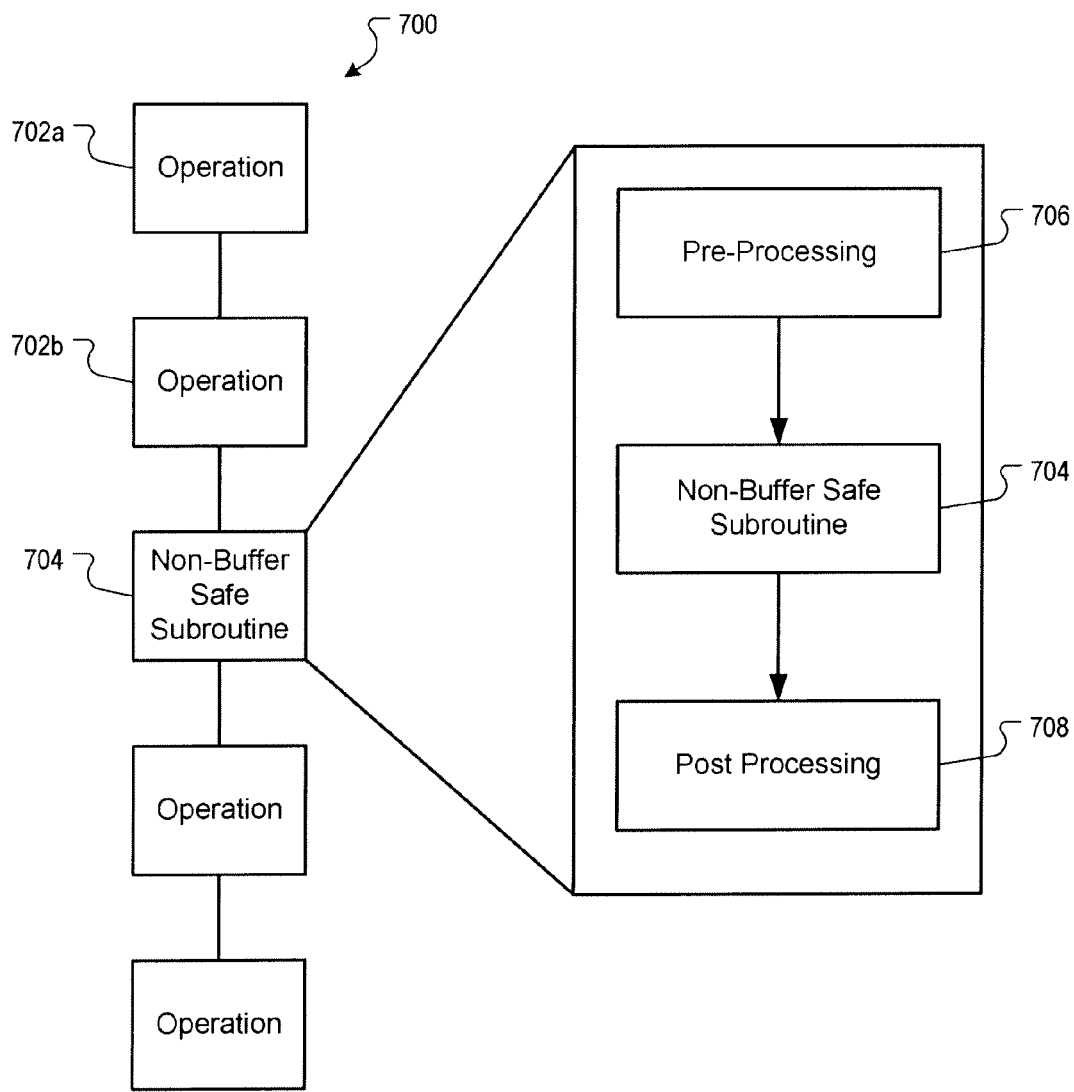
FIG. 7A is a flowchart showing an exemplary demonstration of how a framework may integrate with an existing system to detect buffer overflow attacks before malicious code may be executed.

FIG. 7A is a flowchart showing an exemplary demonstration of how a framework may integrate with an existing system to detect buffer overflow attacks before malicious code may be executed. A computer program 700 may include a series of operations 702*a-b* followed by a non-buffer safe subroutine 704. A framework may intercept the flow of control to the non-buffer safe subroutine implementing pre-processing 706 and post-processing 708. Examples of non-buffer safe functions include, among others, the C programming languages functions "gets", "scanf", "strcat", and "strcpy".

Figure 7B:
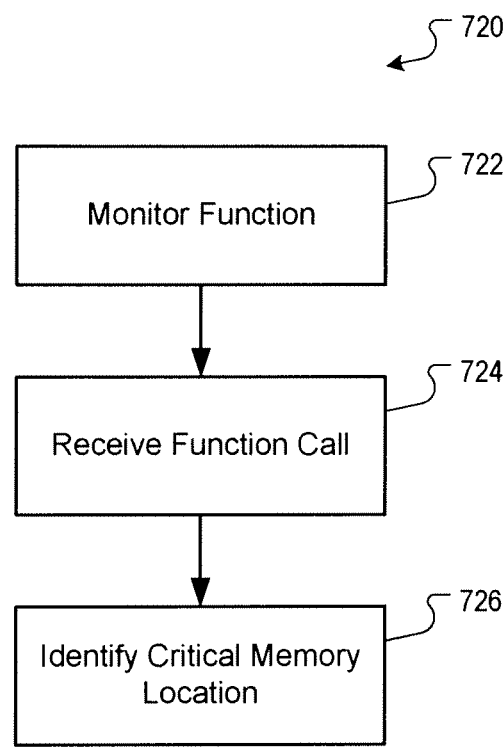
FIG. 7B is a flowchart showing an exemplary process used in the detection of malicious system calls.

FIG. 7B is a flowchart showing an exemplary process used in the detection of malicious system calls. The process identifies a critical memory location for a non-buffer safe subroutine. The example process 720 can be implemented in a malware protection framework consistent with the framework of FIG. 7A, e.g., antivirus software, or embodied in software code that runs independently as a separate program with its own computer processes, services, and resources, or integrating into existing programs by integrating with pre-existing software libraries.

The process monitors a function (722). In some embodiments, the process monitors functions which are vulnerable to buffer overflow attacks. In other embodiments the process monitors all function calls made to a specific library. In still other embodiments, the process monitors all function calls in the program.

The process receives a function call (724). The function call is associated with a call stack which includes one or more base pointers. The function call is also associated with a destination buffer, the buffer being stored on the call stack.

The process identifies a critical memory location vulnerable to a buffer overflow attack (726). The critical memory location may be determined based on the base pointers. In some embodiments, the critical memory location is based on the first base pointer which is located after the destination buffer in the call stack. The critical memory location may be discovered by navigating base pointers from the current base pointer until a base pointer is encountered with an address greater than the address of the destination buffer.

Figure 8:
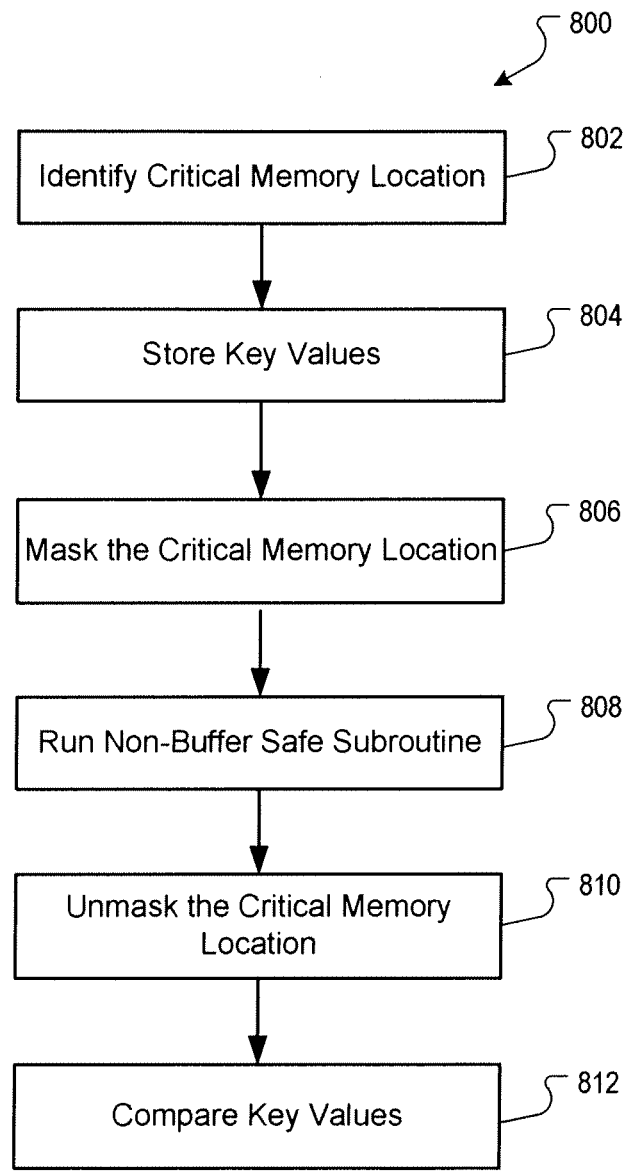
FIG. 8 is a flowchart showing an exemplary process of detecting a buffer overflow attack using pre and post processing.

FIG. 8 is a flowchart showing an exemplary process of detecting a buffer overflow attack using pre- and post-processing. The example process 800 can be implemented in a malware protection framework consistent with the framework of FIG. 7A. The process 800 can be embodied in antivirus software, or embodied in software code that runs independently as a separate program with its own computer processes, services, and resources, or integrating into existing programs by integrating with pre-existing software libraries.

Figure 9A:
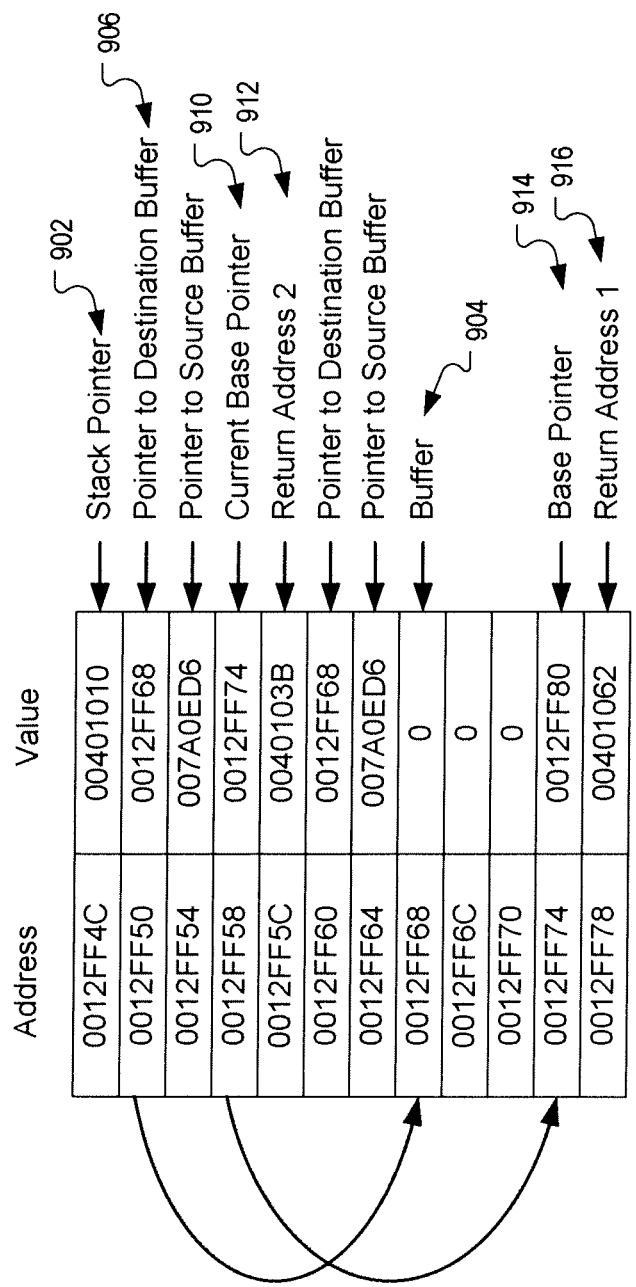
FIG. 9A is a diagram showing an exemplary call stack.

The process identifies a critical memory location (802). In this example, the critical memory location is the location which contains the first return address after the buffer. This location may be identified by navigating the base pointers until a base pointer is identified which is located after the destination buffer. Navigation of a base pointer is describe with reference to FIG. 9A, which is a diagram showing an exemplary call stack. In FIG. 9A, the address of destination buffer 904 is the first parameter 906 passed into the function. The address of the destination buffer 904 is provided at memory location Stack Pointer+4 or memory location '0012FF50' 906, which has a value of '0012FF68'. The memory allocated for the destination buffer 904 is located starting at memory location '0012FF68'.

In this example the process identifies the address of the current base pointer 910, or '0012FF58.' Since '0012FF58' is less than '0012FF68' the process 800 determines that the return address 912 associated with the current base pointer 910 is not vulnerable. The value at the memory location of the current base pointer 910 contains the address of the next base pointer 914. In this example, the value at the location '0012FF58' is '0012FF74'. The address '0012FF74' is greater than the address of the destination buffer '0012FF68', and thus the return address stored in memory location 916 associated with the base pointer 914 is vulnerable. Therefore the critical memory location is located at the memory address of the return address 916 associated with the base pointer 914, or '0012FF78'.

Referring to FIG. 8, the process stores critical values (804). The critical values include the contents of the critical memory location, which, in this example, is the location of the first return address after the destination buffer. The critical values also include the values of any memory location which is a structured exception handler occurring between the start of the destination buffer and the identified critical memory location.

Figure 9B:
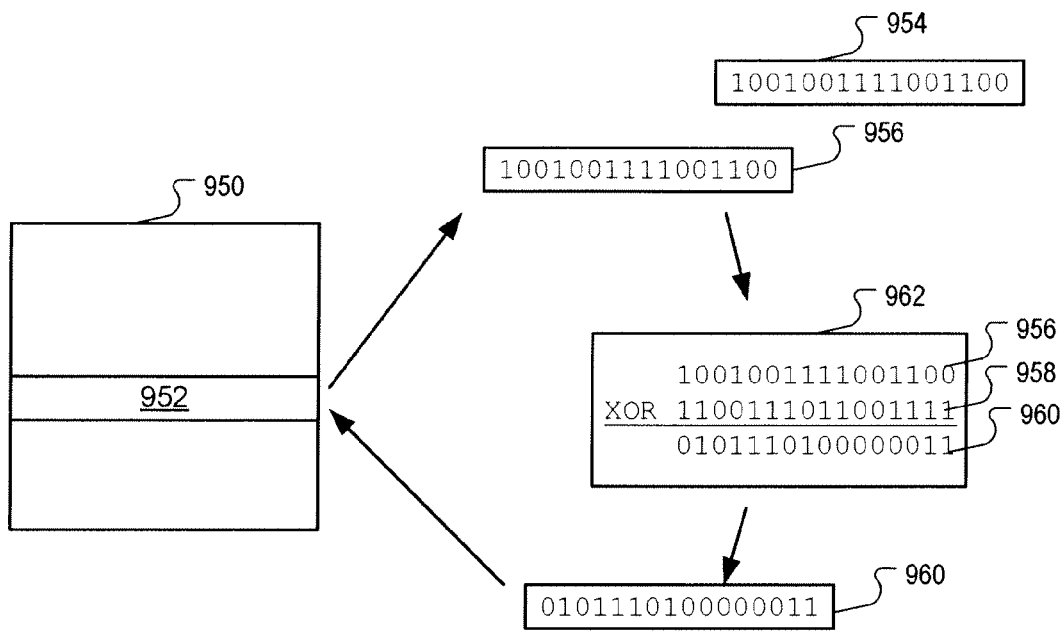
FIG. 9B is diagram showing an example of masking the value located at the critical memory address.

The process masks the critical memory location (806). The process masks the contents of the critical memory location to prevent an attacker from successfully circumvent the check of the critical memory location. FIG. 9B is a diagram showing an example of masking the value located in the critical memory location. In this example, a call stack 950 contains a critical memory location 952, which contains the value 956 "1001001111001100". The value was stored in another location 954 as part of process step 804.

In this example, the value of the critical memory location is masked by performing an "exclusive or" (XOR) of the value located in the critical memory location and a generated random number. In this example the value 956 "1001001111001100" is exclusively ORed with the randomly generated value 958 of "1100111011001111". The result 960 (shown in box 958) is "010111010000011". The result 960 is stored in memory location 952. In addition to, or in place of, the XOR operation, any cryptographic algorithm may be used to encrypt and decrypt the value of the critical memory location. For example, a DES algorithm may be used. In these embodiments the key may be stored separately for later use in decrypting the value of the critical memory location to ensure the integrity of the data. In some embodiments, a random number may be used as a key, for example, the random number described above. Referring to FIG. 8, the process runs the non-buffer safe subroutine (808).

Figure 9C:
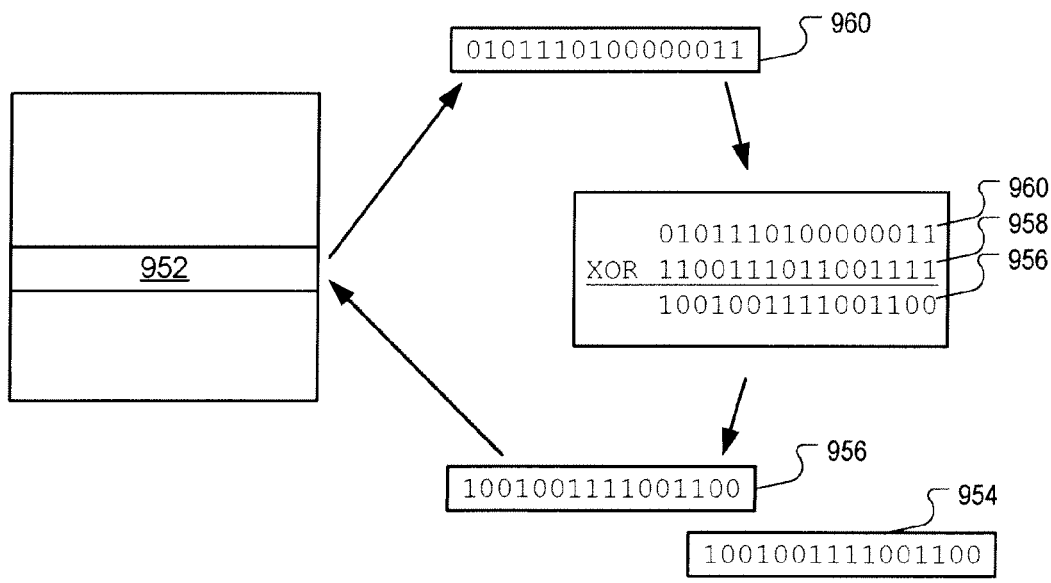
FIG. 9C is diagram showing an example of unmasking the value located at the critical memory address.

The process unmasks the critical memory address (810). Unmasking may be accomplished by applying a function which unmasks the value. For example, the value may be unmasked by applying the same XOR function a second time to the stored value. FIG. 9C is diagram shows an example of unmasking the value located in the critical memory location. The value 960 "0101110100000011" stored in memory location 952 and calculated in step 806 may be XORed with the random number 958 to produce the original value 956.

Referring to FIG. 8, the process compares the critical values (812). The critical values are compared to the values previously stored in step 804. If any of the critical values do not match, then the buffer operation has corrupted the call stack and a potential buffer overflow attack has occurred. For example, referring to FIG. 9C, the value calculated in step 810 is compared to the stored value 954 for the critical memory location. If the values match, then no buffer overflow has modified the memory location 952. Additional stored values for each structured exception handler between the start of the destination buffer and the critical memory location are compared with their current values to ensure they have not been modified.

Figure 10:
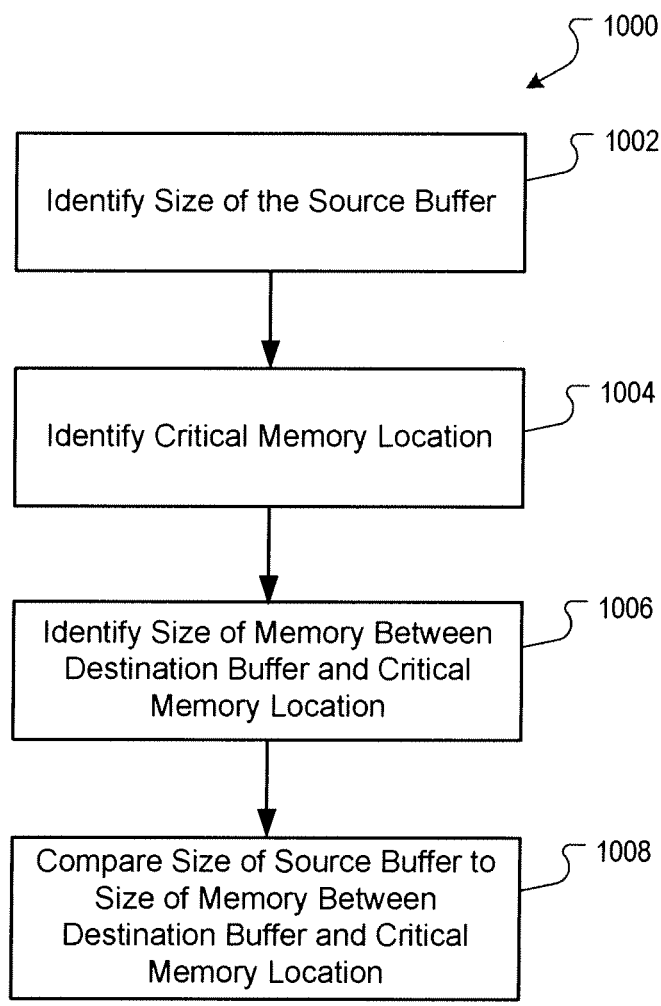
FIG. 10 is a flow diagram of another exemplary process to detect buffer overflow attacks using pre-processing.

FIG. 10 is a flow diagram of another exemplary process to detect buffer overflow attacks using pre-processing. The example process 1000 can be implemented in a malware protection framework consistent with the framework of FIG. 7. The process 800 can be embodied in, e.g., antivirus software, or embodied in software code that runs independently as a separate program with its own computer processes, services, and resources, or integrating into existing programs by integrating with pre-existing software libraries. This implementation detects a potential buffer overflow attack before the non-buffer safe subroutine executes.

The process identifies the size of the source buffer (1002). When the subroutine is called, the contents of the source buffer are provided as a parameter to the subroutine.

The process identifies the critical memory location (1004). In this embodiment, the critical memory location is determined to be the location which contains the first exception handler or first return address which occurs after the destination buffer. The location of the first exception handler may be determined by navigating the exception handlers. For example, referring to FIG. 6, the process begins at the start of the exception chain 610. The exception handler 612 is located at the next memory location (e.g. start of the exception chain+ 4). This address is compared to that of the destination buffer address 606. If the address is greater than the address of the destination buffer, then the address is a potential critical memory location. If the address is less than the address of the destination buffer, then the process navigate to the address stored in the memory location identified by the start of the exception chain. In this example, the address of the handler 612 is less than the address of the destination buffer 606. Therefore the process navigates to the next exception handler, as represented by arrow 614.

The address of the next exception handler 602 is compared to the address of the destination buffer 606. In this example, the address of the next exception handler 602 is greater than the address of the destination buffer 606 and, therefore, it is a potential critical memory location.

The address of the memory location containing the first return address may be determined in a manner similar to the manner described with respect to identifying the critical memory location (802) as described above with respect to process 800.

The memory addresses of the two potential critical locations are compared. Which ever potential critical memory location is closer to the destination buffer is determined to be the critical memory address.

Figure 11:
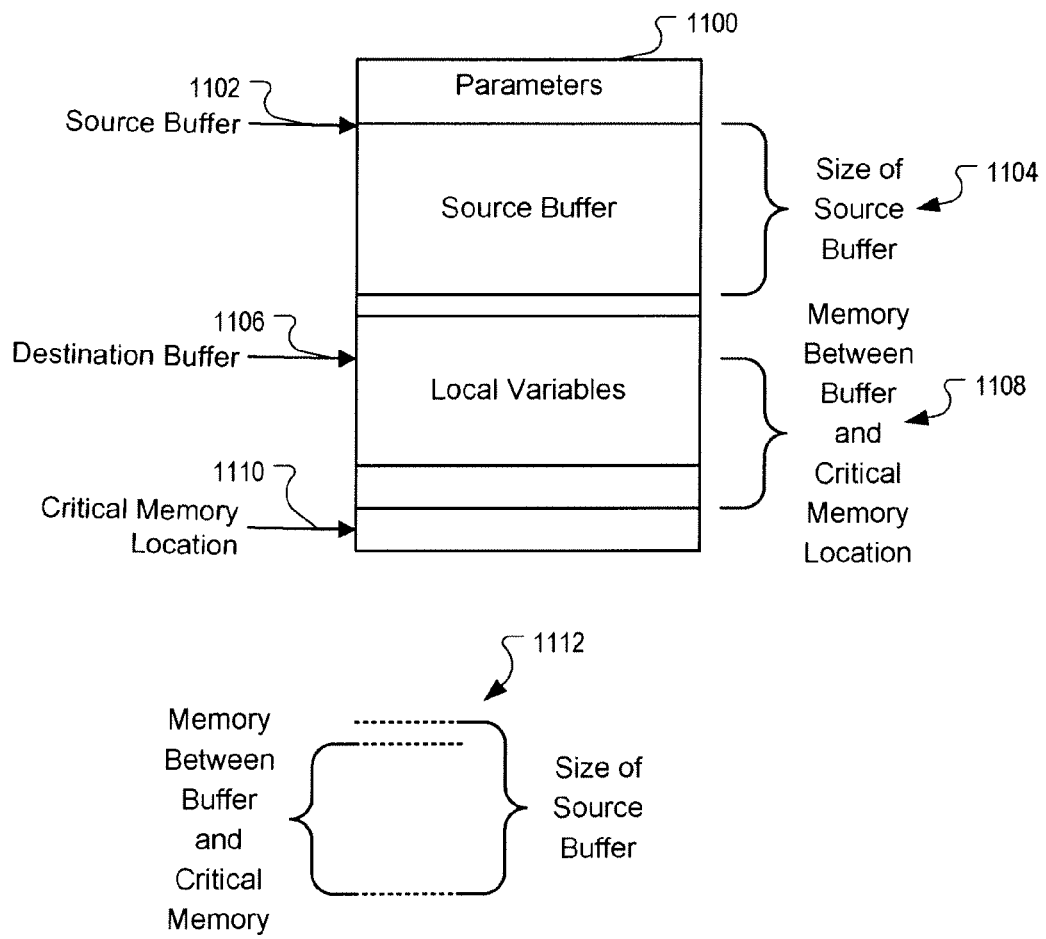
FIG. 11 is a diagram showing an exemplary call stack.

The process determines the size of the memory between the start of the destination buffer and the critical memory location (1006), and compares the size of the source buffer to the size of memory between the destination buffer and the critical memory location (1008). If the size of the source buffer exceeds the size of the memory, then executing the subroutine would result in a corruption of the call stack and is a potential buffer overflow attack. For example, FIG. 11 is a diagram showing an exemplary call stack. The source buffer 1102 occupies a portion of the call stack 1100. The size of the source buffer may be determined based on the amount of memory allocated to it (1104). The call stack also includes a destination buffer (1106). The size of memory 1108 between the critical memory location 1110 and the destination buffer 1106 may be determined, for example, by subtracting the address of the destination buffer from the address of the critical memory location. The size of the memory between the destination buffer and the critical memory location are compared with the size of the source buffer 1112. In this example, the size of the source buffer exceeds the size of the memory between the destination buffer address and the address of critical memory location, and therefore a potential buffer overflow attack is detected.

In another embodiment, the critical memory address is may be masked using a random number in a manner similar masking the critical memory location (806) as discussed above with regard to FIG. 8. While the return address is only referenced after the execution of the called function, an exception hander address can be referenced at anytime in response to an exception occurring. A buffer attack against the exception handler may result in program crash or in the execution of arbitrary code.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous

What is claimed is:

1. A method performed by a data processing apparatus, the method comprising:
    monitoring a function vulnerable to a buffer overflow attack;
    receiving a call to the function, the call associated with a call stack, the call stack including one or more base pointers, and a destination buffer associated with the function;
    identifying a particular one of the one or more base pointers as pointing to a first memory address greater than an address of the destination buffer;
    determining that the first address is a critical memory address based at least in part on identifying that the first memory address is greater than the address of the destination buffer;
    performing a comparison of expected contents of a first memory location identified by the first address with observed contents of the first memory location following an execution of the function based on the received call, wherein the comparison is performed based at least in part on determining that the first memory address is a critical memory address; and
    determining whether the received call corresponds to a potential buffer overflow attack based at least in part on the comparison.

2. The method of claim 1, further comprising masking the contents of the first memory location based at least in part on determining that the first memory address is a critical memory address.

3. The method of claim 2, wherein masking the contents of the first address includes:
    copying the contents, wherein the contents have a first value;
    encrypting the contents to generate an encrypted version of the contents having a second value; and
    storing the second value at the critical first memory location;
    wherein the encrypted version of the contents is compared with the observed contents.

4. The method of claim 3, wherein encrypting the contents includes performing an exclusive or operation on the first value and a random number.

5. The method of claim 1, wherein determining that the first address is a critical memory address further comprises:
    navigating a structured exception handler chain associated with the thread, the structured exception handler chain including at least one of exception handler node;
    identifying a second memory address of a structure exception handler node of the at least one exception handler node where the memory address of the structured exception handler node is greater than the memory address of the destination buffer;
    determining the critical memory address is the smaller of the first memory address and the second memory address.

6. The method of claim 5 further comprising:
    identifying a source buffer associated with the call, the source buffer storing a source value;
    determining a memory size, the memory size equal to an amount of memory between the memory address of the destination buffer and the critical memory address;
    determining a second memory size, the second memory size measuring a size of the source value;
    determining a critical memory location identified by the critical memory address will be affected by a buffer overflow in response to determining the size of the source value exceeds the size of the memory.

7. A computer storage device encoded with a computer program, the program comprising instructions that when executed by data processing apparatus cause the data processing apparatus to perform operations comprising:
    monitoring a function vulnerable to a buffer overflow attack;
    receiving a call to the function, the call associated with a call stack, the call stack including one or more base pointers, and a destination buffer associated with the function;
    identifying a particular one of the one or more base pointers as pointing to a first memory address greater than an address of the destination buffer;
    determining that the first address is a critical memory address based at least in part on identifying that the first memory address is greater than the address of the destination buffer;
    performing a comparison of expected contents of a first memory location identified by the first address with observed contents of the first memory location following an execution of the function based on the received call, wherein the comparison is performed based at least in part on determining that the first memory address is a critical memory address; and determining whether the received call corresponds to a potential buffer overflow attack based at least in part on the comparison.

8. The device of claim 7, further comprising masking the contents of the first memory location based at least in part on determining that the first memory address is a critical memory address.

9. The device of claim 8, wherein the program further comprises instructions that when executed by data processing apparatus cause the data processing apparatus to perform operations comprising:
copying the contents, wherein the contents have a first value;
encrypting the contents to generate an encrypted version of the contents having a second value; and
storing the second value at the critical first memory location;
wherein the encrypted version of the contents is compared with the observed contents.

10. The device of claim 9, wherein encrypting the contents includes performing an exclusive or operation on the first value and a random number.

11. The device of claim 7, wherein determining that the first address is a critical memory address further comprises:
navigating a structured exception handler chain associated with the thread, the structured exception handler chain including at least one of exception handler node;
identifying a second memory address of a structure exception handler node of the at least one exception handler node where the memory address of the structured exception handler node is greater than the memory address of the destination buffer;
determining the critical memory address is the smaller of the first memory address and the second memory address.

12. The device of claim 11 wherein the program further comprises instructions that when executed by data processing apparatus cause the data processing apparatus to perform operations comprising:
identifying a source buffer associated with the call, the source buffer storing a source value;
determining a memory size, the memory size equal to an amount of memory between the memory address of the destination buffer and the critical memory address;
determining a second memory size, the second memory size measuring a size of the source value;
determining a critical memory location identified by the critical memory address will be affected by a buffer overflow in response to determining the size of the source value exceeds the size of the memory.

13. A system comprising:
one or more computers; and;
a computer-readable medium coupled to the one or more computers having instructions stored thereon which, when executed by the one or more computers, cause the one or more computers to perform operations comprising:
monitoring a function vulnerable to a buffer overflow attack;
receiving a call to the function, the call associated with a call stack, the call stack including one or more base pointers, and a destination buffer associated with the function;
identifying a particular one of the one or more base pointers as pointing to a first memory address greater than an address of the destination buffer;
determining that the first address is a critical memory address based at least in part on identifying that the first memory address is greater than the address of the destination buffer;
performing a comparison of expected contents of a first memory location identified by the first address with observed contents of the first memory location following an execution of the function based on the received call, wherein the comparison is performed based at least in part on determining that the first memory address is a critical memory address; and
determining whether the received call corresponds to a potential buffer overflow attack based at least in part on the comparison.

* * * * *